(12) United States Patent
Mazur et al.

(10) Patent No.: US 8,439,201 B2
(45) Date of Patent: May 14, 2013

(54) NANOPARTICLE SEPARATION USING COHERENT ANTI-STOKES RAMAN SCATTERING

(75) Inventors: Eric Mazur, Concord, MA (US); Eric Diebold, Beverly Hills, CA (US)

(73) Assignee: President and Fellows of Harvard College, Cambridge, MA (US)

( * ) Notice: Subject to any disclaimer, the term of this patent is extended or adjusted under 35 U.S.C. 154(b) by 283 days.

(21) Appl. No.: 12/989,833

(22) PCT Filed: May 21, 2009

(86) PCT No.: PCT/US2009/044848
§ 371 (c)(1),
(2), (4) Date: Dec. 20, 2010

(87) PCT Pub. No.: WO2009/143351
PCT Pub. Date: Nov. 26, 2009

(65) Prior Publication Data
US 2011/0155649 A1    Jun. 30, 2011

Related U.S. Application Data

(60) Provisional application No. 61/128,320, filed on May 21, 2008.

(51) Int. Cl.
*B03B 1/00* (2006.01)

(52) U.S. Cl.
USPC .................................. 209/3; 209/2; 977/845

(58) Field of Classification Search ... 209/2, 3; 977/842, 977/845, 901; 356/301
See application file for complete search history.

(56) References Cited

U.S. PATENT DOCUMENTS

| | | | |
|---|---|---|---|
| 7,247,670 B2 * | 7/2007 | Malenfant et al. | 524/496 |
| 7,481,990 B2 * | 1/2009 | Wong et al. | 423/460 |
| 7,744,844 B2 * | 6/2010 | Barrera et al. | 423/447.1 |
| 7,923,075 B2 * | 4/2011 | Yeung et al. | 427/553 |
| 8,221,592 B2 * | 7/2012 | Lee | 204/157.47 |
| 2003/0219889 A1 * | 11/2003 | Sumaru et al. | 435/287.1 |
| 2004/0038251 A1 | 2/2004 | Smalley et al. | |
| 2004/0058058 A1 * | 3/2004 | Shchegolikhin et al. | 427/7 |
| 2004/0191920 A1 | 9/2004 | Farquharson et al. | |

(Continued)

OTHER PUBLICATIONS

International Preliminary Report on Patentability dated Dec. 2, 2010 relating to International Application No. PCT/US2009/044848.

*Primary Examiner* — Joseph C Rodriguez
(74) *Attorney, Agent, or Firm* — Thomas J. Engellenner; Reza Mollaaghababa; Pepper Hamilton LLP

(57) ABSTRACT

The invention provides methods and systems for separating particles that exhibit different Raman characteristics. The method can include introducing nanoparticles, on which Raman-active molecules are adsorbed, into a photopolymerizable resin and exposing to excite Raman active vibrational modes of the molecules to generate Raman-shifted radiation suitable for polymerizing the resin such that the Raman-shifted radiation causes selective polymerization of a resin surrounding nanoparticles if the nanoparticles provide a Raman enhancement factor greater than a threshold. In addition, methods for electrically isolating nanoparticles, or selectively removing one type of nanoparticles from collections, are disclosed. These methods rely on generation of blue-shifted anti-Stokes photons to selectively expose portions of a photoresist covering the nanoparticles to those photons. Such exposure can cause a change in the exposed portions (e.g., polymerize or increase solubility to a developing agent), which can be employed to achieve isolation of the nanoparticles or their selective removal.

30 Claims, 11 Drawing Sheets

U.S. PATENT DOCUMENTS

| | | |
|---|---|---|
| 2006/0191374 A1 | 8/2006 | Guillet |
| 2007/0258880 A1 | 11/2007 | Murakoshi |
| 2010/0208237 A1* | 8/2010 | Mazur et al. .................... 356/51 |
| 2012/0034686 A1* | 2/2012 | Berlin et al. ............... 435/287.2 |
| 2012/0107743 A1* | 5/2012 | Miller ....................... 430/281.1 |
| 2012/0295360 A1* | 11/2012 | Swager et al. .................. 436/58 |

* cited by examiner

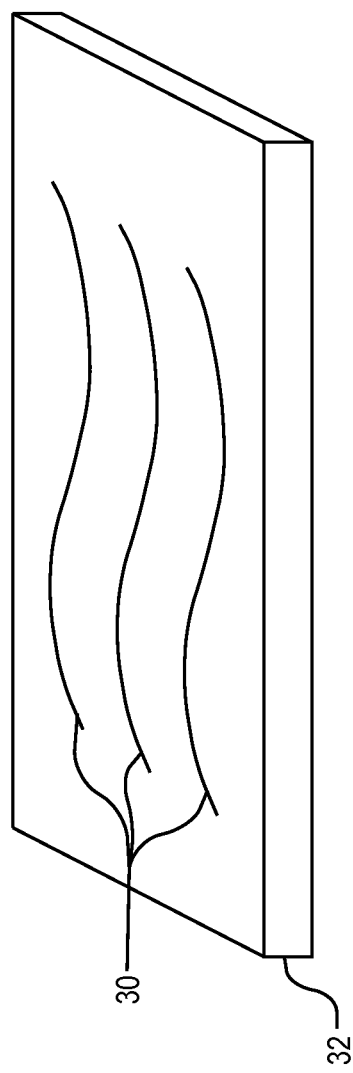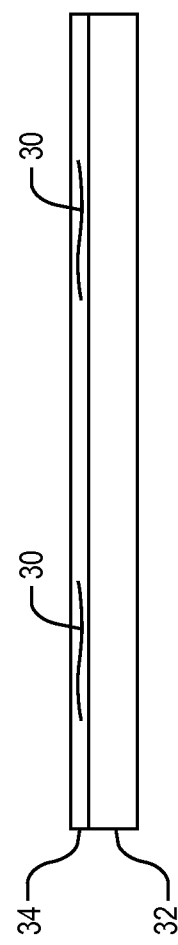

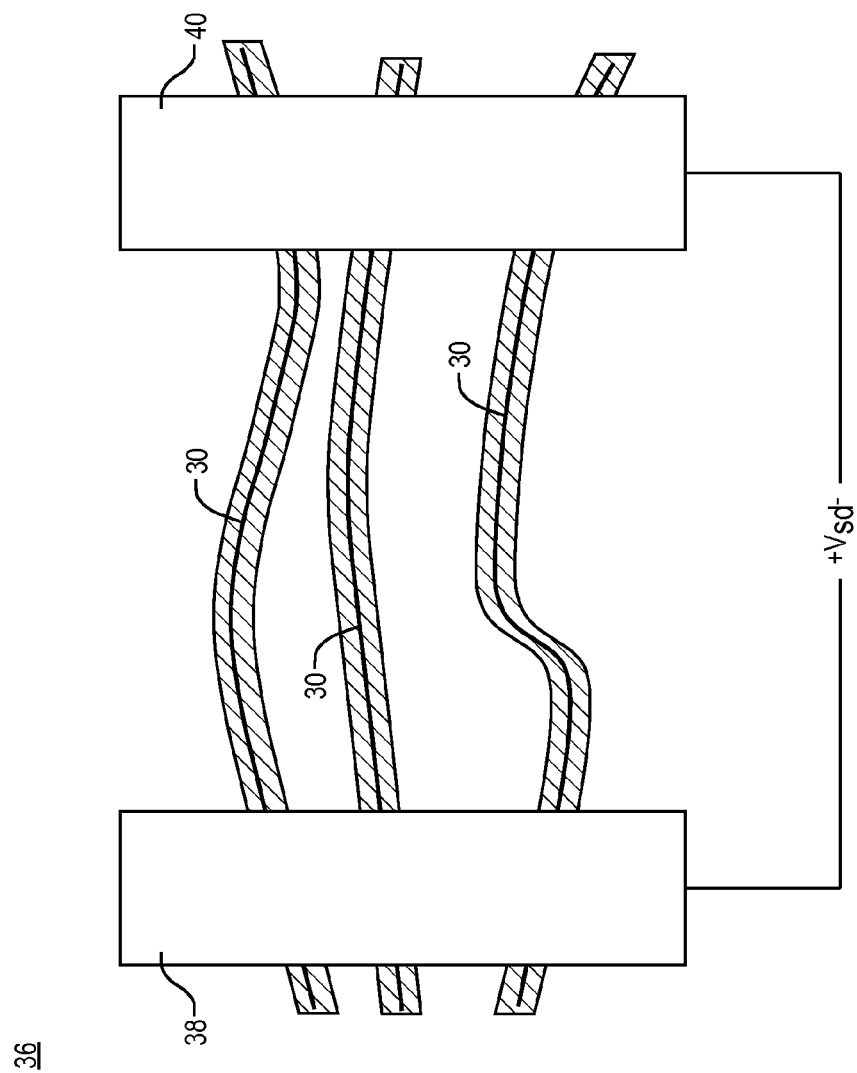

NANOPARTICLE SEPARATION USING COHERENT ANTI-STOKES RAMAN SCATTERING

RELATED APPLICATION

The present application claims priority to a provisional application entitled "Nanoparticle Separation Using Coherent Anti-Stokes Raman Scattering Polymerization for Surface-Enhanced Raman Scattering," filed on May 21, 2008, and having a Ser. No. 61/128,320, which is herein incorporated by reference.

BACKGROUND

The present invention relates generally to methods and systems of screening particles, and particularly, such methods that employ Raman scattering for separating particles of different types.

Raman spectroscopy is a powerful technique that allows identifying molecules via their characteristic spectral fingerprints. It relies on inelastic scattering of incident photons by a molecule, via coupling to its vibrational modes, to provide an essentially unique signature for that molecule. In particular, such inelastic scattering (commonly known as Raman scattering) can cause a decrease or an increase in the scattered photon energy, which appear as "Stokes" and "anti-Stokes" peaks in a wavelength-dispersed spectrum of the scattered photons. A drawback of Raman spectroscopy is that the probability for occurrence of such scattering is small (typically presented as the scattering cross-section).

Raman scattering cross sections can, however, be significantly enhanced by placing the molecules on or near roughened nanoscale metal surfaces. Such a mode of performing Raman spectroscopy is commonly known as surface enhanced Raman spectroscopy (SERS). It has also been demonstrated that significant enhancement in SERS cross-sections can be achieved by placing Raman-active molecules on both aggregates of, and single metallic nanoparticles. However, different metallic nanoparticles can provide widely varying enhancement factors. In other words, not all metallic nanoparticles are equally SERS-active.

Accordingly, there is a need for methods and systems for screening metallic nanoparticles for their SERS activity, and there is a need for such methods that can efficiently separate SERS-active nanoparticles from SERS-inactive nanoparticles.

SUMMARY

In one aspect, the present invention provides a method for separating particles that exhibit different Raman characteristics. Such differing Raman characteristics can be based on different vibrational energy levels of various constituents of the particles and/or based on Raman-scattering enhancement factors that one or more constituents of the particles provide. In one exemplary embodiment of the method, particles exhibiting at least two types of Raman scattering characteristics are contacted with a photopolymerizable medium (e.g., a resin), e.g., by introducing (e.g., dispersing) the particles into a photopolymerizable medium. The particles are then illuminated with radiation so that the Raman-active constituent of the nanoparticles would mediate the generation of Raman blue-shifted anti-Stokes radiation. The efficiency of the generation of such blue-shifted anti-Stokes radiation can differ for different particle types. For example, in cases where the particles comprise metallic nanoparticles on which Raman-active molecules are adsorbed, the extent to which the nanoparticles enhance Raman scattering cross sections of the adsorbed molecules can determine how efficiently the blue-shifted anti-Stokes radiation is generated. In other cases, the incident radiation can be selected to be on resonance with a vibrational transition of one type of the particles and not with the other type(s). The on-resonance particles would generate Raman scattered blue shifted anti-Stokes radiation more efficiently than the off-resonance particles.

The resin is selected such that it will polymerize in response to the blue shifted anti-Stokes radiation (the resin is preferably selected not to undergo polymerization in response to the incident radiation). As the particles exhibiting a greater Raman scattering cross-section (either intrinsically or due to SERS enhancement) mediate the generation of the blue shifted radiation more efficiently, a portion of the resin surrounding them undergoes a greater degree of polymerization than the resin surrounding those particles exhibiting significantly lower Raman scattering cross-sections. In fact, in many cases the resin surrounding the particles that do not exhibit high Raman-scattering cross-sections remains substantially (or entirely) unpolymerized. Such a non-uniform polymerization of the resin can in turn give rise to non-uniform addition of polymeric mass to particles of different types. This non-uniformity can then be utilized to separate the particles exhibiting high Raman-scattering cross-section from others based on their mass difference (e.g., via centrifugation), or differences in their mobility or size, or other suitable characteristics based on the added polymeric mass. For example, the particles to which the polymeric resin has been added can exhibit a different mobility, e.g., a different mobility in a fluid and/or under the influence of an electric field, than others.

In a related aspect, the present invention provides methods for screening nanoparticles, and particularly metallic nanoparticles, based on the level of Raman scattering enhancement that they provide. By way of example, the methods of the invention can be employed to separate SERS-active nanoparticles (herein referred to also as "hot" nanoparticles or particles), from SERS-inactive or less active nanoparticles. In some cases, a SERS-active nanoparticle can sufficiently enhance the Raman scattering cross-section associated with a Raman-active molecule in its vicinity (e.g., a molecule adsorbed on it surface) so as to render single-molecule Raman detection feasible. In some embodiments, the screening process employs SECARS (surface enhanced coherent anti-Stokes Raman scattering) anti-Stokes photons generated via dye molecules adsorbed onto nanoparticles (a dye molecule can act as a mediator for the generation of anti-Stokes photons in the 4-wave mixing SECARS process) to selectively polymerize a resin around the nanoparticles that enhance the SECARS process. The polymerized resin adds mass to the "hot" nanoparticles, which in turn allows their separation, e.g., via centrifugation or other techniques. The polymerized resin can then be removed from separated "hot" particles and those particles can be suspended in a liquid. In this manner, the population percentage of the "hot" particles in a solution can be enriched.

In another aspect, a method of separating carbon nanotubes of different types is disclosed that includes dispersing a plurality of carbon nanotubes with at least two different types in a photopolymerizable medium, where the two nanotube types are characterized by their varying Raman scattering characteristics (or their different electrical conductivity). The dispersed nanotubes can then be illuminated with incident radiation so as to cause resonant Raman scattering from nanotubes of one type and thereby generate blue-shifted anti-Stokes radiation having a wavelength suitable for polymerizing the medium. The incident radiation is, however, selected to be off-resonance for the nanotubes of the other type. The blue-shifted anti-Stokes radiation causes polymerization of at least a portion of the resin surrounding the on-resonance nanotubes adding polymeric mass to those nanotubes, while the resin surrounding the off-resonance nanotubes remains substantially (or entirely) unpolymerized.

In another aspect, the invention provides methods of electrically isolating, e.g., via formation of an electrically non-conducting coating, one or more nanoparticles, e.g., carbon nanotubes, disposed over a substrate, e.g., a silicon substrate. By way of example, the method can include forming, e.g., via spin-casting, a negative-tone photopolymerizable photoresist layer over the nanoparticles, e.g., a layer having a thickness in a range of about 0.1 to about 5 microns such that the nanoparticles are contained within the layer. Incident radiation can then be directed to the photoresist covering the nanoparticles, e.g., to expose the nanoparticles and/or one or more Raman-active molecular species close to the nanoparticles (e.g., in the optical near field of the nanoparticles) to the radiation, so as to cause generation of blue-shifted anti-Stokes photons (e.g., via CARS or SECARS processes) such that the anti-Stokes photons are absorbed by at least portions of the photoresist surrounding the nanoparticles to cause their polymerization, thereby forming an electrically insulating coating that at least partially surrounds the nanoparticles.

The incident radiation can include, e.g., two pump beams each at a pump frequency ($\omega_p$) and a Stokes beam at a frequency of ($\omega_s$) such that a difference between the pump and the Stokes frequencies corresponds to a vibrational frequency of at least one Raman active vibrational mode of the nanoparticles. Further, in some cases, the frequency of the pump beam or the frequency of the Stokes beam, or both, can be selected to correspond to at least one electronic transition (transition between two electronic states) of the nanoparticles so as to enhance the resonant coherent anti-Stokes Raman scattering.

In some implementations (e.g., in some cases in which the nanoparticles are metallic), the difference between the frequency of the pump photons and the frequency of the Stokes photons can correspond to the vibrational frequency of at least one Raman active mode of one or more molecules in the vicinity of the nanoparticles (e.g., in the optical near-field of the nanoparticles). Further, the frequency of the pump photons and/or the frequency of the Stokes photons can correspond to the frequency of at least one electronic states transition (or the frequency of at least one plasmon resonance) of the nanoparticles, that is, either the pump photons and/or the Stokes photons can be in resonance with at least one electronic transition or at least one plasmon mode of the nanoparticles. The nanoparticles then cause an enhancement of the resonant Raman scattering from the molecules in their vicinity to generate anti-Stokes photons for causing polymerization of layers of the photoresist surrounding the nanoparticles. In some cases, at least one constituent of the photoresist surrounding the nanoparticles having one or more Raman active modes can be utilized to generate anti-Stokes photons. The nanoparticles can enhance the effective Raman scattering cross-section of the portions of the Raman-active constituent in their proximity (e.g., within the optical near field, for example, within a distance of less than about 100 nm) to generate sufficient number of anti-Stokes photons for polymerizing portions of the photoresist surrounding the nanoparticles. When a Raman-active constituent of the photoresist is utilized, the other portions of the constituent can exhibit much lower Raman-scattering cross-section.

In some cases, one or more molecular species that exhibit at least one Raman-active mode can be deposited on the surface of the nanoparticles prior to the deposition of the photoresist layer such that those molecular species would mediate the generation of the blue-shifted anti-Stokes photons. For example, the nanoparticles can be coated initially, at least partially, with a molecular layer exhibiting one or more Raman active modes and subsequently a photoresist layer can be formed over the coated particles to contain them. The Raman-active molecular layer can then be exposed to incident radiation to generate blue-shifted anti-Stokes photons via coherent resonant Raman scattering. By way of example, a self-assembled monolayer of an alkanethiol molecule can be deposited over a metallic nanoparticle to form a Raman-active layer that can mediate the generation of blue shifted anti-Stokes photons.

Hence, in the above methods, the incident radiation can be directed into the photoresist containing the nanoparticles to cause generation of the anti-Stokes photons either via resonant Raman scattering of incident photons from the nanoparticles themselves or via resonant coherent anti-Stokes Raman scattering from molecules in their vicinity (e.g., in the optical near field of the nanoparticles).

The incident radiation can be, e.g., in the form a radiation pulses. In some cases, the radiation pulses can have a duration in a range of about 20 femtoseconds to about 5000 femtoseconds, and an energy in a range of about 1 nanoJoules to about 1 Joule.

Subsequent to causing polymerization of photoresist portions that at least partially surround the nanoparticles, the unexposed portions of the photoresist (that is, the portions not exposed to the anti-Stokes photons) can be removed, e.g., by dissolving those portions in a developing agent, to leave behind the coated nanoparticles on the substrate.

A variety of photoresist resins and developing agents can be employed in the above method. An example of suitable photoresists includes, without limitation, epoxy-based polymers, such as resists marketed by MicroChem Corp. of Newton, Mass., U.S.A. under trade designations SU-8, and some examples of suitable developing agents include, without limitation, propylene glycol, monomethyl ether acetate (PG-MEA) and acetone.

In another aspect, a method for selectively removing one type of nanoparticles from a collection of nanoparticles of different types that are disposed over a substrate is disclosed. The method includes forming, e.g., via spin-casting, a photoresist layer over a plurality of nanoparticles of at least two different types disposed on a substrate, e.g., a silicon substrate, such that the nanoparticles are contained at least partially within the resist layer. The nanoparticles are then exposed to incident radiation such that the nanoparticles of one type would mediate the generation of blue-shifted anti-Stokes photons via direct resonant Raman scattering or via enhancing the resonant Raman scattering of nearby molecules (e.g., via CARS or SECARS processes), while the nanoparticles of the other type(s) do not mediate generation of a substantial number of anti-Stokes photons, if any. The photoresist is selected such that at least portions of the resist that are exposed to the anti-Stokes photons absorb those photons to change their solubility in a developing agent.

For example, when the photoresist comprises a positive-tone photoresist, the absorption of the anti-Stokes photons can render the photoresist portions absorbing those photons soluble to a developing agent (or enhance the photoresist's solubility to a developing agent). On the other hand, when the photoresist comprises a negative-tone photoresist, the photoresist portions that absorb the anti-Stokes photons become polymerized and hence less soluble to a developing agent.

Subsequently, a developing agent can be applied to the photoresist layer to remove the soluble portions thereof, thereby uncovering one type of the nanoparticle while leaving the other type(s) covered. The uncovered nanoparticles can then be removed, e.g., via known physical or chemical etching processes, leaving behind the covered nanoparticles of the other type(s). The photoresist covering the nanoparticles that are left behind can then be removed, if desired, by utilizing a variety of known chemical treatments (typically referred to as "resist stripping" processes). Typically, resist stripping is accomplished by removing the exposed resist using either a liquid solvent (typically an organic solvent such as acetone, or acidic mixtures, such as Pirhana etch-sulfuric acid and hydrogen peroxide; or using a dry etch, such as an oxygen plasma. The dry etching process is often called "ashing."

In a related aspect, in the above method, the incident radiation can comprise two pump beams each at a pump frequency ($\omega_p$) and a Stokes beam at a frequency of ($\omega_s$) such that a difference between the pump and the Stokes frequencies corresponds to a vibrational frequency of at least one Raman active vibrational mode of one type of the nanoparticles but is distinct from the vibrational frequencies of the Raman-active modes of the other type (or types) of the nanoparticles. Moreover, in some cases (e.g., when the method is applied to separate carbon nanotubes of different types), the pump photons or the Stokes photons can be resonant with at least one electronic transition of the nanoparticles.

In some cases, resonant Raman scattering of the incident radiation from one or more Raman-active molecules close to the nanoparticles, rather than the nanoparticles themselves, can be utilized to selectively generate anti-Stokes photons in the vicinity of one type of the nanoparticles but not the other type(s). For example, in some cases in which the nanoparticles comprise metallic nanoparticles of different types, the difference between the frequency of the pump photons and that of the Stokes photons can be selected to correspond to the vibrational frequency of at least one Raman active mode of the nearby Raman-active molecules (e.g., a Raman active constituent of the surrounding photoresist). By way of example, the nearby molecules can be located within the near optical field of the nanoparticles. In addition, the frequency of the pump photons or the frequency of the Stokes photons can be selected to be in resonance with at least one plasmon resonance of one type of the nanoparticles but be off-resonance relative to the plasmon resonances of the other type(s). In this manner, the nanoparticles of one type (those having plasmon resonance(s) corresponding to the pump or the Stokes frequencies) participate in enhancing the resonant Raman scattering of the incident radiation from nearby molecules while the nanoparticles of the other types do not mediate such enhancement. Thus, some portions of the photoresist that surround the nanoparticles providing Raman scattering enhancement are exposed to anti-Stokes photons at a level suitable for causing a substantial change to their solubility to a developing agent while the respective solubility of the other portions of the photoresist remains substantially unchanged. Subsequently, the nanoparticles providing the Raman enhancement can be removed from the substrate by utilizing the steps discussed above.

In the following discussion of selectively removing one type of nanoparticles from a collection of nanoparticles having different types, the terms "resonant nanoparticle(s)" and "non-resonant nanoparticle(s)" are employed. The term "resonant nanoparticle" refers to a nanoparticle that exhibits at least Raman active mode having a vibrational frequency corresponding to the frequency difference between the pump photons and Stokes photons in a CARS process or exhibits at least one electronic state resonance (or plasmon resonance) at a frequency corresponding to either the Stokes or the pump frequencies. The term "non-resonant nanoparticle," as used herein, refers to a nanoparticle that does not include a Raman active vibrational mode corresponding to the difference between the pump and Stokes frequencies, nor does it include an electronic state resonance (or plasmon resonance) at a frequency corresponding to that of the pump photons or the Stokes photons.

The incident radiation can be, e.g., in the form radiation pulses. In some cases, the radiation pulses can have a duration in a range of about 20 femtoseconds to about 5000 femtoseconds, and an energy in a range of about 1 nanoJoules to about 1 Joules.

In some implementations, the above method can be utilized to selectively remove metallic carbon nanotubes from a collection of metallic and semiconducting carbon nanotubes disposed over a substrate, or vice versa.

A variety of photoresists and developing agents can be utilized in the above method for selective removal of one type of nanoparticles from a collection of nanoparticles of different types. An example of suitable photoresist include, without limitation, resists marketed by MicroChem Corp. of Newton, Mass., U.S.A. under trade designations SU-8, and some examples of suitable developing agents include, without limitation, propylene glycol monomethyl ether acetate (PGMEA) and acetone.

Further understanding of the invention can be obtained by reference to the following detailed description and the associated drawings, which are discussed briefly below.

BRIEF DESCRIPTION OF THE DRAWINGS

FIG. 7 is a schematic view of certain parts of a device in which carbon nanotubes are incorporated, where the carbon nanotubes are electrically isolated from other parts of the device by employing the teachings of the invention.

DETAILED DESCRIPTION

The present invention is generally directed to methods and systems for separating particles (e.g., nanoparticles) by employing their Raman scattering characteristics including, without limitation, differences in intrinsic vibrational levels of such particles and/or their efficacy in improving surface enhanced Raman scattering (SERS) exhibited by Raman-active molecules adsorbed on such particles or present in their vicinity. In many of the following embodiments, the term SERS-active nanoparticles is used to refer to those nanoparticles that enhance Raman scattering of a Raman-active molecule adsorbed thereon by a factor more than a threshold (e.g., by more than about $10^4$ or $10^6$), while the term SERS-inactive nanoparticles is used to refer to those nanoparticles that provide no enhancement or a weak enhancement of the Raman scattering (e.g., an enhancement less than about $10^4$). The term "nanoparticle" is known in the art, and is used herein to refer to a particle (e.g., a collection of atoms, such as gold or silver atoms) whose size in at least one dimension (e.g., in x, y, or z dimension), and in some cases all dimensions, is equal or preferably less than about 1 micron. For example, it can refer to particle having an average cross-sectional diameter in a range of about 1 nanometer to about 1 micron, or in a range of about 1 nm to about 300 nm, or in a range of about 5 nm to about 100 nm. It should, however, be understood that the teachings of the invention can be equally applicable to particles having larger sizes.

Figure 1:
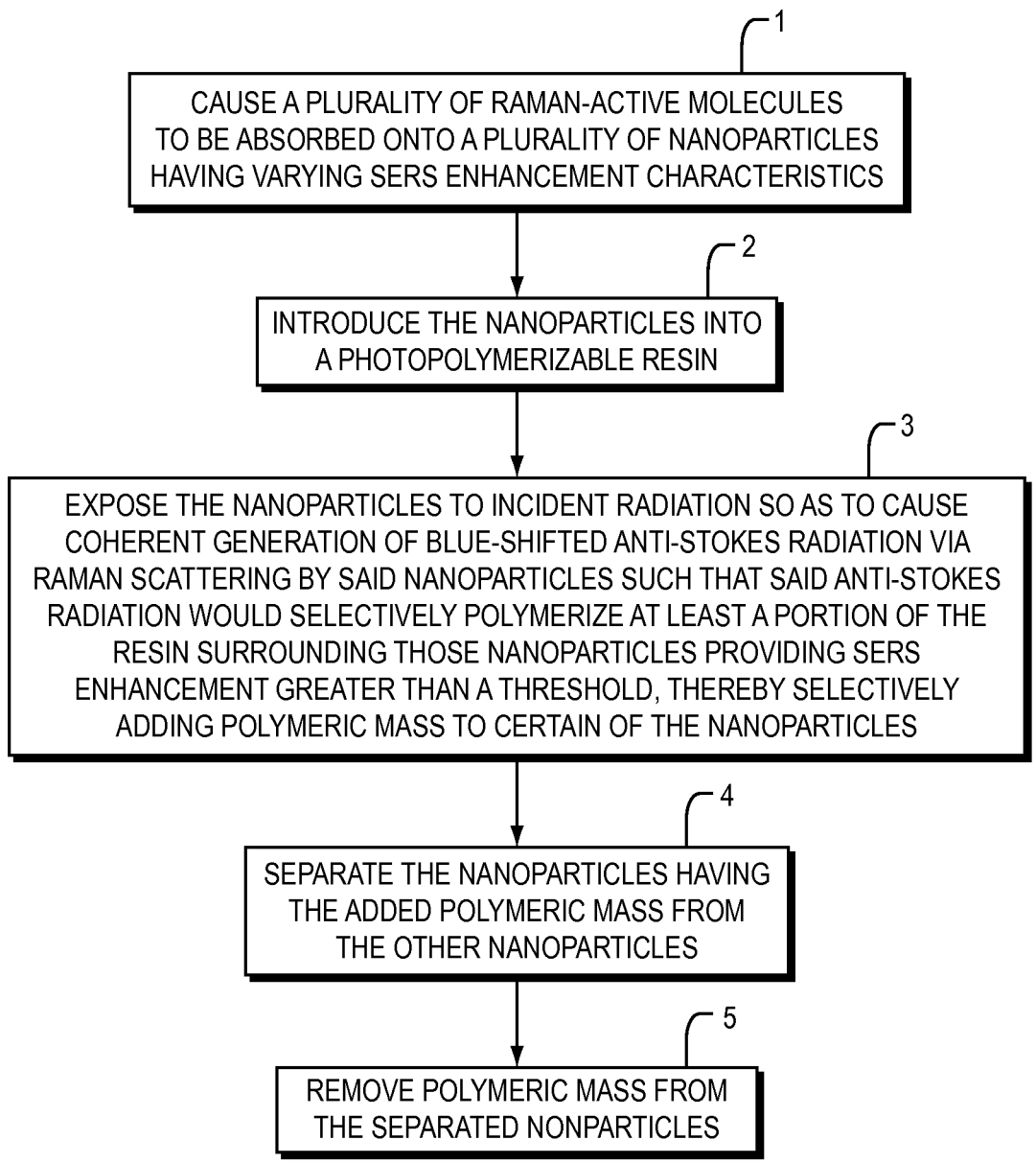
FIG. 1 is a flow chart depicting various steps of an exemplary embodiment of a method according to the teachings of the invention for separating nanoparticles exhibiting differing Raman-scattering enhancement.

With reference to a flow chart 10 in FIG. 1, in one exemplary embodiment of a method of the invention for separating SERS-active nanoparticles from SERS-inactive nanoparticles, a plurality of nanoparticles (in this case, metallic nanoparticles formed, e.g., of gold or silver) are initially (step 1) incubated with a Raman-active dye to cause the dye molecules to be adsorbed onto the nanoparticles (e.g., via Van-der-Waals, ionic or in some cases covalent interactions). In many cases, the nanoparticles are maintained in a colloidal form in a solvent (e.g., in a water-based solvent) to which the dye can be added. As discussed in more detail below, the Raman-active dye will provide the molecular vibrational energy levels needed to mediate the SECARS process.

Subsequently, in step (2), the nanoparticles (many of which (and preferably all) include one or more of the dye molecules) are suspended in a photopolymerizable resin. The term "photopolymerizable resin" is known in the art and generally refers to a resin in which polymerization can be initiated via exposure to radiation having one or more suitable wavelengths (the radiation initiating polymerization in the resin is herein referred to as the polymerizing radiation). In many embodiments, the resin is preferably selected to have an appropriate linear absorption spectrum such that blue-shifted anti-Stokes photons generated via coherent Raman scattering of radiation incident on the dye molecules, as discussed in more detail below, would cause polymerization of the resin only around those nanoparticles that efficiently enhance the Raman scattering process, e.g., those nanoparticles that provide a Raman scattering enhancement factor greater than a threshold value. As noted above, these nanoparticles are herein referred to as SERS-active particles. The resin surrounding the nanoparticles that do not provide a significant Raman scattering enhancement remains substantially (or in many cases entirely) unpolymerized, as the generation of blue-shifted anti-Stokes photons by the dye molecules surrounding such particles is not significantly enhanced by the nanoparticles. Some examples of suitable photopolymerizable resins include, without limitation, photoresists, photoinitiator-monomer mixtures, and other optically curable polymer mixtures.

More specifically, in step (3), in this embodiment, coherent anti-Stokes Raman scattering (CARS) is employed to cause polymerization of the resin surrounding those nanoparticles that provide a large SERS enhancement factor, e.g., an enhancement factor greater than about $10^4$ and preferably greater than about $10^7$. For example, various portions of the resin in which the nanoparticles are suspended can be illuminated with pump and Stokes radiation to cause generation of blue-shifted anti-Stokes photons via coherent Raman scattering by the adsorbed dye molecules. The nanoparticles that exhibit large Raman scattering enhancement factors (e.g., enhancement factors greater than about $10^7$) can lead to efficient generation of blue shifted anti-Stokes photons via their adsorbed dye molecules with sufficient intensity to cause polymerization of the resin surrounding those nanoparticles. In contrast, the blue-shifted anti-Stokes photons are not efficiently generated (if generated at all) via the dye molecules adsorbed on the nanoparticles that do not provide significant Raman scattering enhancement factors (as noted above, these nanoparticles are herein referred to as SERS-inactive nanoparticles). As a result, the resin surrounding such SERS-inactive nanoparticles remains substantially (or entirely) unpolymerized.

Figure 2:
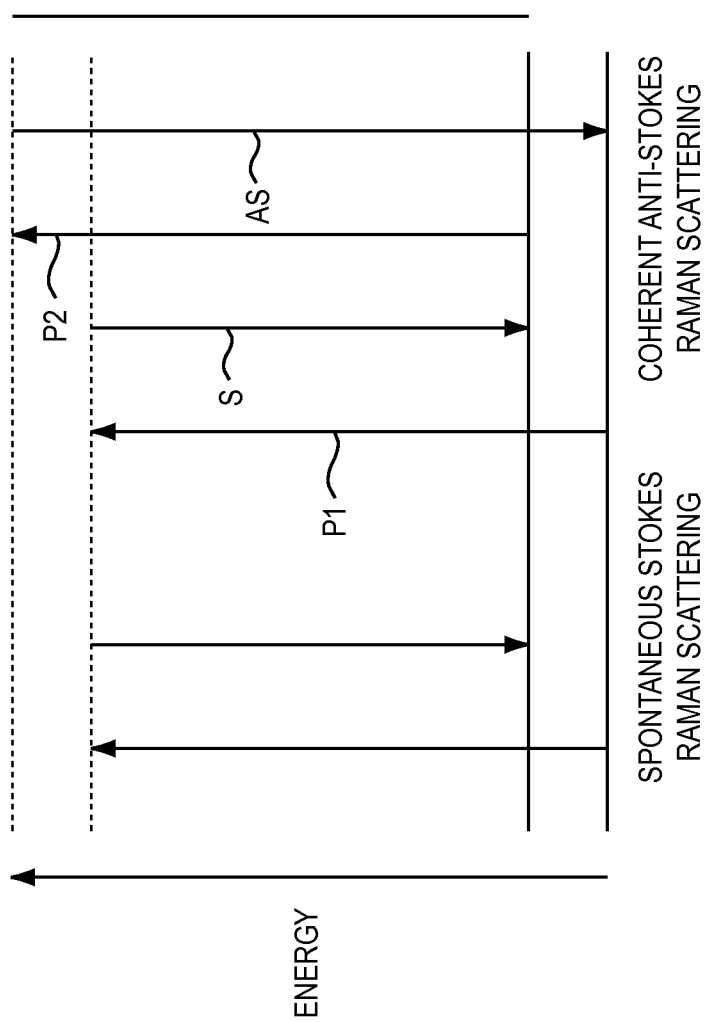
FIG. 2 presents a schematic energy diagram depicting spontaneous Raman scattering and CARS four-wave mixing process.

As known in the art, CARS is a non-linear four-wave mixing process in which two pump photons and one Stokes photon are mixed to yield a blue-shifted anti-Stoke photon. This process is mediated by a resonant vibrational energy state of a molecule (in this embodiment the energy state of the dye molecule). Although similar to spontaneous Raman scattering, the CARS anti-Stokes emission is coherent. The intensity of the coherent output (blue-shifted anti-Stokes radiation) can be enhanced by several orders of magnitude when the difference of the pump and Stokes photon energies equals a vibrational energy of a molecule. By way of further illustration, FIG. 2 presents a schematic energy diagram depicting spontaneous Raman scattering and CARS four-wave mixing processes. In CARS, the pump photons (arrows P1 and P2) and Stokes photons (arrow S) are tuned to have an energy difference equal to a vibrational energy state of the molecule (the dashed lines represent virtual states, while the solid lines represent real vibrational states). In CARS, the input pump and Stokes photons cause the generation of blue shifted anti-Stokes photons (AS arrow).

As the Raman-active dye molecules are adsorbed in this embodiment onto colloidal metallic nanoparticles, the inherent local field enhancement provided by the surface plasmon resonant colloidal nanoparticles lead to the generation of surface enhanced CARS (SECARS). The incident pump laser frequency can be selected to coincide with a fundamental surface plasmon resonance of the nanoparticles in solution. The Stokes laser frequency is preferably selected to be CARS-resonant with a large wavenumber vibrational frequency of the molecule (in this implementation the dye molecule) adsorbed onto the nanoparticles. Further, in many embodiments, the Stokes laser frequency is preferably selected to be non-resonant with a large number (and preferably all) of the vibrational frequencies of the solution or the resin. Further, the resin is preferably selected such that the pump and Stokes laser frequencies lie outside of its linear absorption spectrum. Moreover, the Raman-active molecules adsorbed onto the nanoparticles are preferably chosen in many embodiments to exhibit a strong, large wavenumber Raman band such that the anti-Stokes photons would spectrally lie within the linear absorption band of the resin. The choice of a high wavenumber Raman band can ensure that the pump and the Stokes photons would not cause direct polymerization of the resin.

With continued reference to FIG. 1, in step (4), the SERS-active and SERS-inactive nanoparticles can be separated based on the additional polymeric mass added to the SERS-active nanoparticles due to the polymerization of their surrounding resin. By way of example, such separation can be achieved using centrifugation. Other techniques based on the difference in size or mobility of nanoparticles having the added polymeric mass relative to the other nanoparticles can also be employed.

In step (5), the polymerized resin and the adsorbed Raman-active molecules are removed from the separated SERS-active nanoparticle, e.g., by chemical washing or plasma treatment. The nanoparticles can then be re-suspended in a desired solvent, yielding a solution of SERS-active nanoparticles.

In some other embodiments, the above process can be implemented without using the dye molecules to mediate the generation of the anti-Stokes radiation. Rather, localized SERS enhancement provided by some of a plurality of particles suspended in a Raman-active photopolymerizable resin can be used to generate CARS anti-Stokes photons via resin molecules in close vicinity of those particles (e.g., on the surface of the particles) but not in the bulk of the resin far away from those particles. For example, a plurality of particles can be suspended in a photopolymerizable resin and the resin can be illuminated such that the resin molecules on the surface of the particles exhibiting a high SERS enhancement factor (e.g., an enhancement factor greater than about $10^4$ or greater than about $10^6$) would mediate the generation of anti-Stokes photons. These photons can in turn cause selective polymerization of the resin surrounding those particles that provide high SERS enhancement, thereby selectively adding polymeric mass to those particles.

A variety of parameters can be varied in the above process to adjust the criteria for selecting SERS-active nanoparticles. For example, by lowering the concentration of the dye in the nanoparticle incubation step such that there is an average of one molecule adsorbed on each nanoparticle, only those nanoparticles that provide sufficient Raman scattering enhancement to yield single-molecule SECARS would be selected (the resin surrounding only those particles would be polymerized, thus leading to their selection). Further, tuning the intensity of the pump and Stokes laser pulses will enable control over the magnitude of the Raman enhancement required to polymerize the resin.

In some embodiments, a high average power table-top picosecond laser system can be employed to subject a large volume (e.g., about 1 milliliter) of a nanoparticle-resin solution to the SECARS process using a single laser pulse. By way of example, with a laser repetition rate of about 1 kHz, in some cases the above nanoparticle separation process can be performed at a very high throughput rate, e.g., on the order of one liter per second (not including centrifuge and resin removal time).

Figure 3:
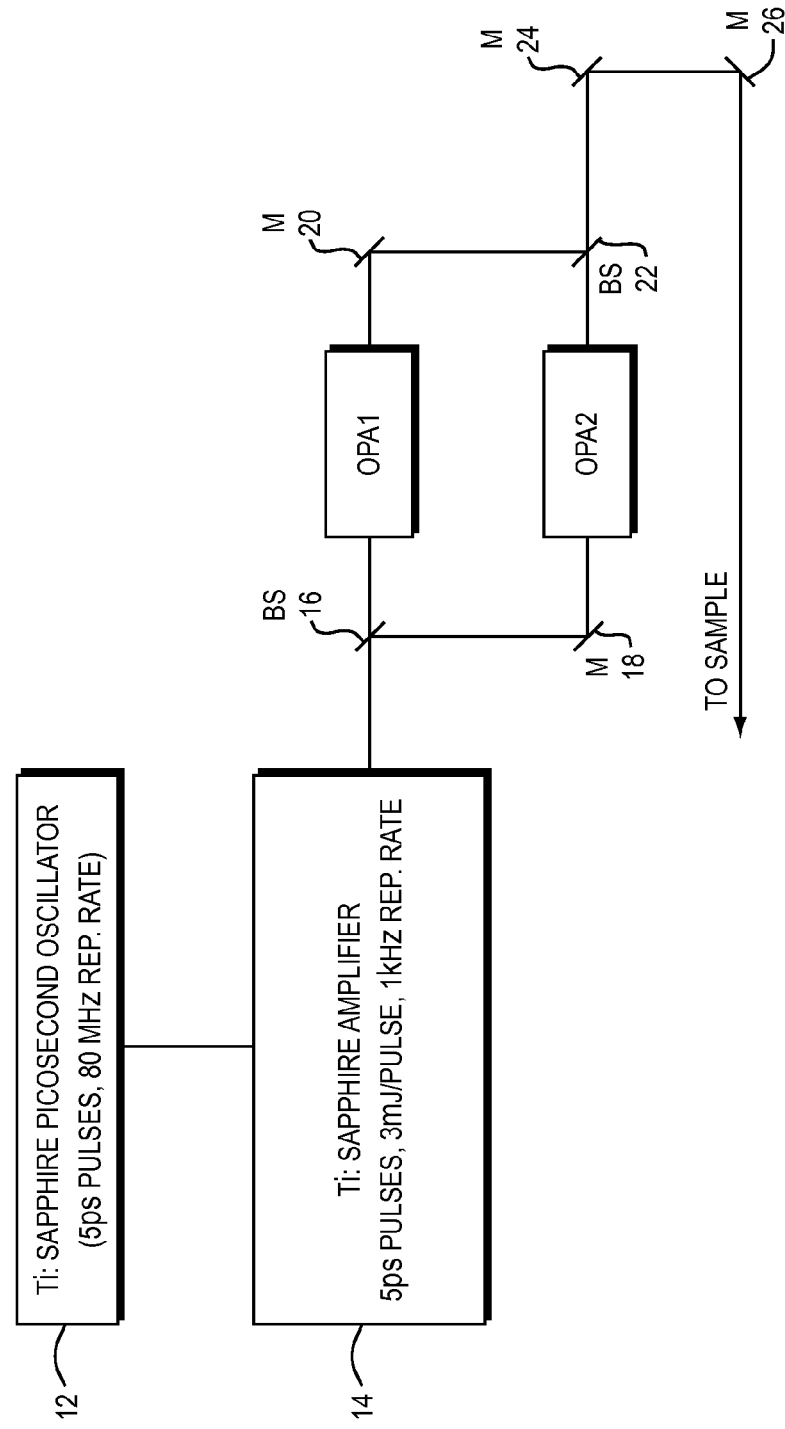
FIG. 3 is an exemplary system for practicing the methods of the invention.

FIG. 3 schematically depicts an example of such a laser system 10 that includes a Ti:sapphire oscillator 12 that functions as a mode-locked laser to produce picosecond optical pulses at a wavelength of 800 nm. The pulses can be amplified by a Ti:sapphire regenerative amplifier 14, which can operate based on chirped pulse amplification (CPA). The amplified pulses are then split by a 50:50 beamsplitter (BS) 16 in order to concurrently pump two optical parametric amplifiers (OPA1, OPA2). More specifically, a portion of the photons in each pulse passes through the beam splitter 16 to pump the OPA1 and the rest of the photons in that pulse are reflected by that beam splitter and a mirror 18 to pump the OPA2. In this exemplary implementation, these optical parametric amplifiers provide two picosecond pulses with an energy of approximately 50 microJoules over a tunable wavelength range of about 350 nm to about 1800 nm. In this implementation, the wavelengths are chosen to be near (but not within) the optical absorption band of the photopolymerizable resin, as well as near the surface plasmon resonance frequency of the nanoparticles. The two optical parametric amplifiers can be tuned to be separated in wavelength by an amount corresponding to a vibrational energy level of the Raman-active molecule (e.g., a dye molecule in this embodiment) adsorbed onto the nanoparticles. The pulses generated by the OPA1 are reflected by a mirror 20 to be recombined with the pulses generated by the OPA2 via a beamsplitter 22 into a single radiation beam that can be directed via mirrors 24 and 26 onto a sample under investigation. It should be understood that the optical system 10 is provided for illustrative purposes and other systems can be also be employed to practice the separation methods of the invention.

In some cases, the nanoparticles can be formed of aggregates of gold or silver atoms, with the fundamental surface plasmon resonances of the nanoparticles lying in the violet to green region of the visible spectrum. In some embodiments in which such gold or silver nanoparticles are employed the pump and the Stokes laser radiation can be provided by two optical parametric amplifiers pumped by a picosecond titanium:sapphire regenerative amplifier, such as those discussed above in connection with the system shown in FIG. 3. As noted above, the amplifier can be seeded by a tunable titanium-sapphire picosecond amplifier. Such a system can provide independently-tunable, picosecond pump and Stokes wavelength pulses at a repetition rate of about 1 kHz. In some implementations, the system can provide pulse energies in the range of about 150 microJoules across the wavelength range of about 350 nm to about 1100 nm. Such wavelength flexibility can allow matching the pump wavelengths to the plasmon resonances of both gold and silver nanoparticles, as well as eliciting SECARS signals from different vibrational modes of molecules adsorbed to the nanoparticles.

In another aspect, the invention provides methods for separating carbon nanotubes based on their semiconducting or metallic character (e.g., based on their electrical conductivity). Carbon nanotubes are known in the art as members of the fullerene structural family. Carbon nanotubes are allotropes of carbon with a nanostructure that can exhibit in many cases a length-to-diameter ratio greater than about 1,000,000. They are typically in the form of cylindrical structures with diameters of the order of a few nanometers. A variety of carbon nanotubes, such as single-walled and multi-walled carbon nanotube are known. In the class of single-walled nanotubes, both metallic and semiconducting nanotubes are known. Such nanotubes are typically grown in batches that contain both semiconducting and metallic nanotubes. The use of carbon nanotubes in electronic devices, however, requires that the nanotubes be of the correct type (semiconducting or metallic).

Figure 4:
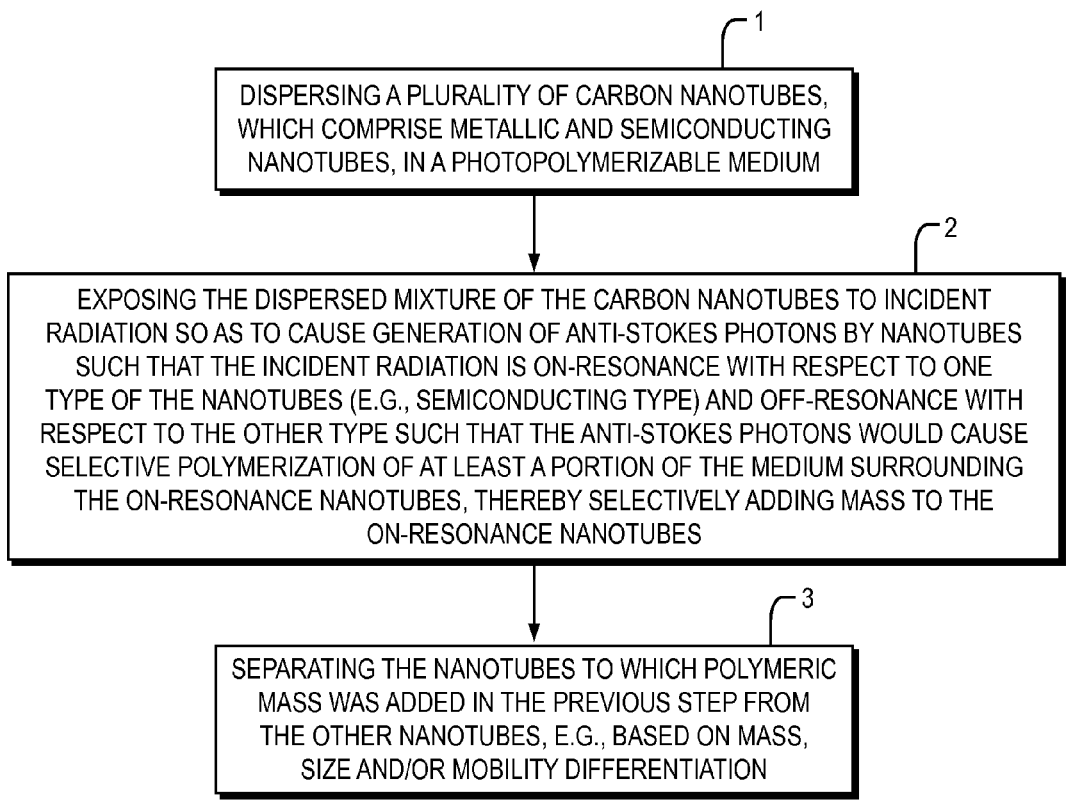
FIG. 4 is a flow chart depicting various steps of an exemplary embodiment of a method according to the teachings of the invention for separating metallic carbon nanotubes from semiconducting carbon nanotubes.

With reference to flow chart of FIG. 4, one exemplary method according to the teachings of invention for separating semiconductor carbon nanotubes from metallic carbon nanotubes includes dispersing a plurality of carbon nanotubes, which can contain both semiconducting and metallic nanotubes, in a photopolymerizable medium (step 1). The photopolymerizable medium has preferably a different Raman spectrum from that of either type of carbon nanotubes. In some cases, the Raman spectra of the medium and those of the two types of carbon nanotubes can be distinct. In some other cases, the Raman spectrum of the medium and that of at least one type of the carbon nanotubes may have some overlap but exhibit sufficiently different Raman scattering cross-sections for at least one excitation wavelength to allow performing the methods of the invention, as discussed further below.

In step (2), the dispersed mixture of the carbon nanotubes can be exposed to high intensity laser pulses of appropriately chosen wavelengths so as to generate anti-Stokes photons, via Raman scattering of the incident photons by the carbon nanotubes, which are blue-shifted from the incident photons (as noted above, this process is known as coherent anti-Stokes Raman scattering (CARS)). In particular, in some embodiments, the incident photons can include photons from two pump beams each at a wavelength of 425 nanometers ($\lambda_p$) and a Stokes beam at a wavelength of 454 nanometers ($\lambda_s$). The generation of the blue-shifted anti-Stokes photons is enhanced when the pump and the Stokes photons are separated in frequency by an amount equal to a vibrational frequency of a nanotube exposed to the incident radiation. Hence, the intensity of the CARS blue-shifted anti-Stokes photons generated by an individual nanotube will be determined by whether or not the incident photons are in resonance with a vibrational frequency of that nanotube.

As metallic and semiconducting nanotubes have different vibrational frequencies, the wavelengths of the incident photons can be selected (e.g., 425 nanometers corresponding to $\lambda_p$ and 454 nanometers corresponding to $\lambda_s$) such that the incident radiation is in resonance with one type of nanotubes and not with the other. The intensity of the blue-shifted photons generated by the nanotubes in resonance can be significantly greater than the respective intensity of such photons (if any) generated by the nanotubes that are not in resonance with the incident radiation.

The photopolymerizable medium (resin) in which the nanotubes are dispersed is chosen such that it would absorb the generated blue-shifted anti-Stokes photons and undergo polymerization when exposed to those photons. More specifically, the resin is selected such that the blue-shifted photons generated via the nanotubes scattering on resonance will be absorbed by the surrounding polymerizable medium to cause polymerization, thereby adding polymer mass to those nanotubes that are on resonance with the incident radiation. In contrast, photopolymerizable medium surrounding the nanotubes that are not on resonance with the incident radiation remains substantially (or entirely) unpolymerized, as these nanotubes do not generate blue-shifted anti-Stokes photons with sufficient intensity, even if they generate them, so as to cause significant polymerization of the photopolymerizable medium surrounding them.

In this manner, polymeric mass is selectively added to one type of the nanotubes, but not the other (even if some polymeric mass is added to the carbon nanotubes that are off-resonance, the mass selectively added to the on-resonance carbon nanotubes is significantly greater that the mass added to the off-resonance nanotubes). In other words, mass is added selectively to the carbon nanotubes based on whether they are metallic or semiconducting.

Subsequently, in step (3), the nanotubes can be separated, e.g., via centrifugation, based on their mass differences. More specifically, the nanotubes on resonance with the incident photons are removed from the rest, thus separating metallic and semiconducting nanotubes. Techniques other than centrifugation can also be employed. For example, the mass selectively added to the on-resonance carbon nanotubes can change their mobility and/or size relative to off-resonance nanotubes, allowing their separation.

In some cases, the polymeric mass attached to the separated nanotubes that were on resonance with the incident radiation can be removed by employing techniques known in the art, such as chemical washing, or plasma treatment. Once semiconducting and metallic nanotubes are separated, they can be selectively used in a variety of applications, including molecular electronic devices.

Through the use of high average power laser sources, this above separation process can be scaled up to separate large quantities of nanotubes in a short period of time.

In another aspect, the invention provides methods of selectively isolating one or more nanoparticles (e.g., carbon nanotubes), or selectively removing one or more carbon nanotubes, that are deposited over a substrate. These methods generally rely on generation of blue-shifted anti-Stokes photons to selectively expose portions of a photoresist layer covering the nanoparticles to those photons. Such exposure can cause a change in the exposed portions (e.g., polymerize those portions or increase their solubility to a developing agent), which can in turn be employed to achieve isolation of the nanoparticles or their selective removal, as discussed in more detail below. In the following discussion, the salient features of the methods are discussed in connection with carbon nanotubes. These methods can also be applied to other types of nanoparticles exhibiting suitable characteristics, e.g., appropriate Raman-active vibrational modes and/or suitable electronic states resonance(s).

Figure 5:
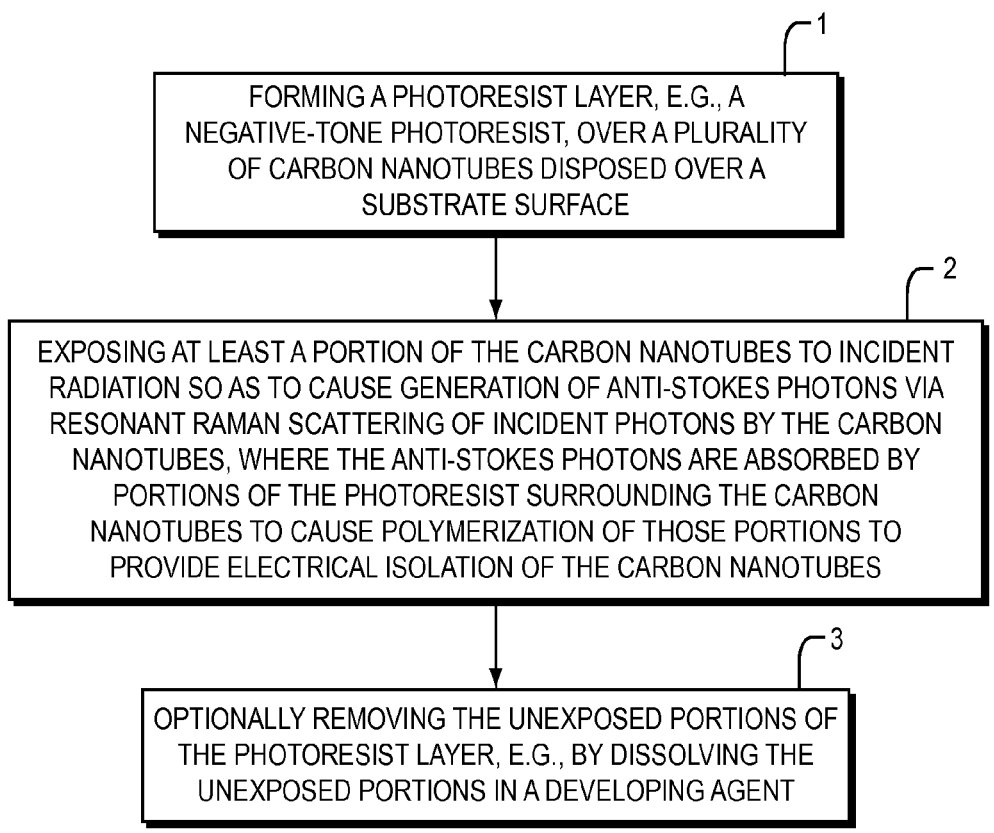
FIG. 5 is a flow chart depicting various steps in an embodiment of a method according to the teachings of the invention for electrically insulating one or more nanoparticles disposed over a substrate.
Figure 6C:
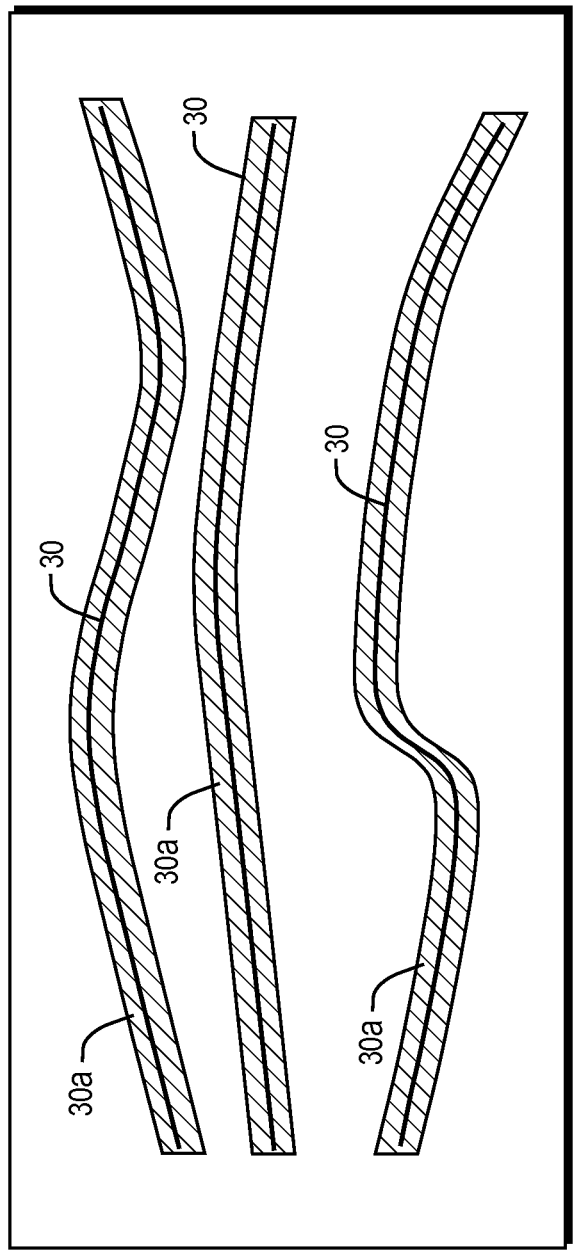
FIG. 6A is a schematic perspective view of a substrate on which a plurality of carbon nanotubes are disposed.
FIG. 6B is a schematic side view of the substrate of FIG. 6A after deposition of a negative-tone photoresist layer over the carbon nanotubes, FIG. 6C schematically shows that portions of the negative photoresist that have been polymerized (shaded areas) via absorption of blue-shifted anti-Stokes photons to form an electrically insulating coating around the carbon nanotubes.

By way of example, with reference to flow chart of FIG. 5 as well as FIGS. 6A-6C, in one embodiment of a method for selectively isolating one or more carbon nanotubes 30 disposed over a substrate 32 (e.g., a silicon substrate), a photoresist layer 34 can be formed over the substrate so as to cover at least a portion of the carbon nanotubes (step 1). The thickness of the photoresist layer can be, e.g., a few microns. By way of example, the photoresist layer can be spin-cast over the carbon nanotubes to form a thin layer with a thickness, e.g., in a range of about 0.1 microns to about 5 microns. The photoresist is preferably chosen so as to be transparent, or at least substantially transparent, to radiation applied in a subsequent step to cause generation of anti-Stokes photons via coherent Raman scattering of incident radiation by some of the carbon nanotubes, as discussed below. Further, the photoresist is preferably chosen such that at least one Raman active mode of the carbon nanotubes would be distinct from the Raman active modes of the photoresist. In some cases, the Raman spectrum of the photoresist and that of the carbon nanotubes may have some overlap but exhibit sufficiently different Raman scattering cross-sections for at least one excitation wavelength to allow performing the subsequent steps.

In this exemplary implementation, the photoresist is a negative-tone photoresist that can undergo polymerization, which renders it insoluble to a developing agent, in response to exposure to radiation having a suitable wavelength that would correspond to the wavelength of anti-Stokes photons generated via resonant Raman scattering of incident photons by the carbon nanotubes, as discussed further below. Further, the photoresist is chosen so as to exhibit good electrical insulation upon undergoing polymerization. Some examples of suitable photoresists include, without limitation, resists marketed by MicroChem Corp. of Newton, Mass., U.S.A. under trade designations SU-8.

Subsequently, the carbon nanotubes (or in some cases, Raman active molecules in their vicinity) can be exposed to incident radiation, e.g., by scanning high intensity laser pulses over the sample, so as to generate blue shifted coherent anti-Stokes photons via resonant Raman scattering of the incident photons by the nanotubes (e.g., via CARS process), or in some cases by a Raman-active compound in the vicinity of the nanotubes (e.g., via SECARS process) (step 2). For example, in some implementations, the incident photons can include photons from two pump beams and a Stokes beam such that the pump and the Stokes photons are separated in frequency by an amount equal to the vibrational frequency of a Raman-active mode of the carbon nanotubes. By way of example, in some cases, the two pump beams can be each at a wavelength of 425 nanometers ($\lambda_p$) and a Stokes beam at a wavelength of 454 nm ($\lambda_s$). Further, in some implementation, the frequency of the pump photons or that of the Stokes photons corresponds to the frequency of at least one electronic states transition of the carbon nanotubes.

The anti-Stokes photon can be absorbed by the photoresist surrounding the carbon nanotubes. In response to the absorption of the blue anti-Stokes photons, a layer of the negative-tone photoresist surrounding the carbon nanotubes undergoes polymerization and as a result becomes insoluble to a developing agent, such as propylene glycol monomethyl ether acetate (PGMEA) and acetone, while the unexposed portions of the photoresist remain soluble to the developing agent. As shown schematically in FIG. 6C, the polymerized photoresist forms an electrically insulating coating 30a that surrounds the carbon nanotubes, thereby electrically isolating the nanotubes from electrical leads that can subsequently be deposited on top of the polymerized and unpolymerized nanotubes.

Subsequently, in step 3, a developing agent can be applied to the photoresist layer to remove the unexposed portions of the photoresist, which are soluble to the agent while leaving the exposed portions of the photoresist (portions exposed to the anti-Stokes radiation at sufficient intensity to undergo polymerization) surrounding the carbon nanotubes substantially, and preferably entirely, intact. In some cases, the plurality of carbon nanotubes include different types where some of the nanotubes exhibit one or more Raman active modes in resonance with the frequency difference between the pump and the Stokes photons (resonant carbon nanotubes) while the others do not (non-resonant carbon nanotubes). In such cases, the resonant carbon nanotubes can be electrically isolated in a manner discussed above without affecting the non-resonant carbon nanotubes.

Figure 8:
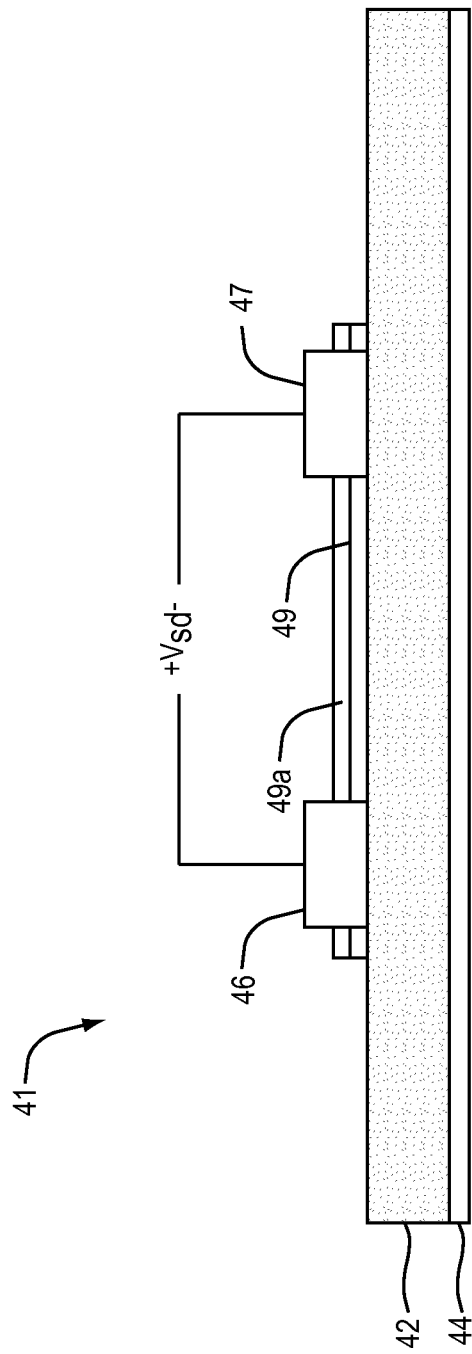
FIG. 8 is a schematic view of a field effect transistor in which a carbon nanotube is incorporated, where the carbon nanotube is electrically isolated from other parts of the device by employing the teachings of the invention.

The electrically-insulating, non-conducting layer of the exposed photoresist surrounding the carbon nanotubes can provide electrical isolation between the nanotubes and other components of a circuit present on a substrate. Such electrical isolation can prevent short circuits in electrical circuitry that employs carbon nanotubes as circuit elements. By way of example, FIG. 7 shows parts of an electrical device 36 (e.g., a field effect transistor) that includes two electrical contacts 38 and 40 (e.g., metal pads) placed on portions of a plurality of carbon nanotubes 30 that extend between two electrical contacts to form electrical contact therewith. At least a portion of each of the carbon nanotubes is coated with a layer of cured, non-conducting photoresist 30a by using the above process to provide electrical isolation from other elements of the device. By way of further example, FIG. 8 schematically depicts a field effect transistor 41 formed on a silicon wafer 42. The transistor 41 includes a back gate contact layer 44, and two electrical contacts 46 and 47 and carbon nanotube 49 that is electrically insulated along at least an axial portion thereof via an insulating layer 49a (e.g., polymerized layer) by utilizing the above teachings. The carbon nanotube 49 is electrically insulated from the contacts 46 and 47 by its insulating coating. The contacts 46 and 47 function as source and drain contacts while the carbon nanotube 49 functions as the channel of the device. In other implementations, a top-gate, rather than a back-gate, can be utilized, where a gate contact can be placed on tope of an electrically insulating layer covering the nanotube (but the source and the drain contacts remain electrically contacted to the nanotube). The gate voltage causes an electric field to pull or push charge carriers onto or off of the nanotube from the substrate, thereby altering the nanotube's electrical conductivity. By altering the electrical conductivity of the nanotube with a gate voltage, the current allowed to flow between the source and drain electrodes can be controlled.

In another aspect, the invention provides methods for selectively removing one type of carbon nanotubes (e.g., metallic nanotubes) from a collection of nanotubes of different types disposed over a substrate. For example, such methods can be employed to selectively remove non-resonant nanotubes from a collection of resonant and non-resonant nanotubes disposed over a substrate surface. As used herein, the term "resonant nanotube" refers to a nanotube that includes at least one Raman active mode that can resonantly scatter photons, for given pump and Stokes frequencies, in a CARS process to coherently generate anti-Stokes photons and/or includes an electronic states transition, or a plasmon resonance, at a frequency corresponding to that of the pump photons and/or the Stokes photons. The term "non-resonant nanotube," as used herein, refers to a nanotube that does not include such a Raman active vibrational mode at the difference frequency between the pump and Stokes frequencies, and nor does it include an electronic states transition (or a plasmon resonance) at a frequency corresponding to the frequency of the pump photons or that of the Stokes photons. In other words, while the resonant nanotubes can mediate generation of anti-Stokes photons (e.g., via a CARS or SECARS process), the non-resonant nanotubes are not capable of mediating the generation of a substantial amount of anti-Stokes photons, if any.

Figure 9:
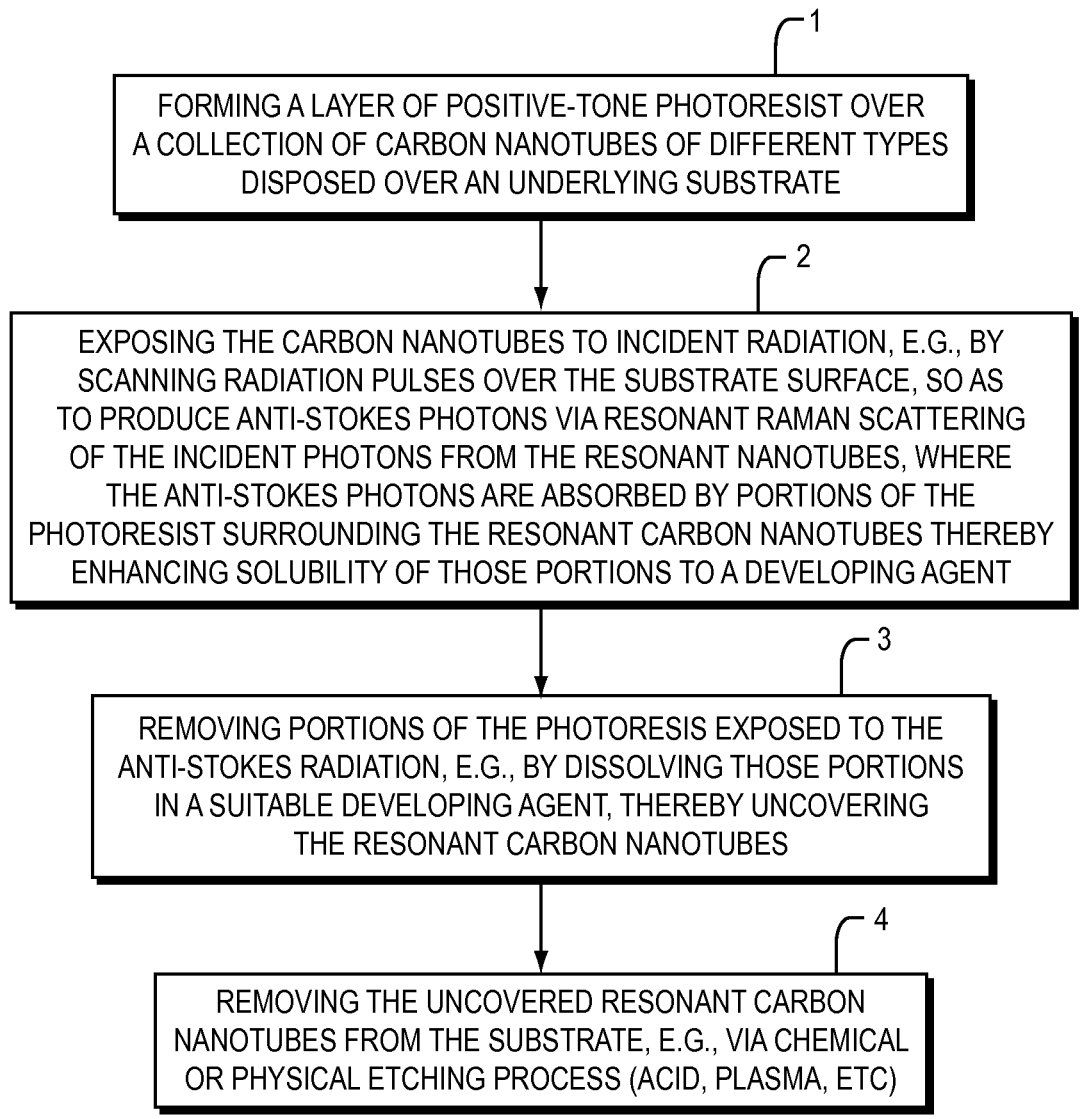
FIG. 9 is a flow chart depicting various steps in an embodiment of a method for selectively removing one type of nanoparticles from a collection of nanoparticles of different types in accordance with the teachings of the invention, FIG. 10A schematically depicts a substrate over a surface of which a plurality of carbon nanotubes of different types are disposed and a positive-tone photoresist layer disposed over that surface to cover the nanotubes, FIG. 10B schematically shows that a portion of the photoresist (shaded area) has been exposed to anti-Stokes photons generated by a resonant carbon nanotube in its vicinity, thereby rendering that photoresist portion soluble to a developing agent.

For example, with reference to flow chart of FIG. 9 as well as FIGS. 10A-10D, in some exemplary embodiments, a layer of a positive-tone photoresist 51 (e.g., a photoresist marketed by Shipley Company of Marlborough, Mass. U.S.A. under the trade designation S1805) can be formed over a collection of nanotubes 53a and 53b of different types disposed over an underlying substrate (e.g., a silicon wafer) 57 to contain the nanotubes (step 1). By way of example, the nanotubes 53a can be metallic (e.g., they can exhibit ohmic conductivity properties) while the nanotubes 53b can be semiconducting (e.g., they exhibit non-ohmic conductivity properties), or vice versa. The thickness of the photoresist layer can be, e.g., in a range of about 0.1 microns to about 5 microns. Similar to the previous embodiment, the photoresist is preferably chosen to be transparent, or at least substantially transparent, to incident radiation applied in a subsequent step to generate anti-Stokes photons, as discussed below, and capable of absorbing anti-Stokes radiation via resonant Raman scattering of incident photons by at least some of the carbon nanotubes to enhance its solubility in a developing agent.

In a subsequent step (2), the nanotubes can then be exposed to incident radiation, e.g., by scanning pulsed radiation over the substrate surface, so as to produce anti-Stokes photons via resonant Raman scattering of the incident photons from the resonant nanotubes. The generated anti-Stokes photons are absorbed by portions of the resist surrounding the resonant nanotubes. In particular, the photoresist, the pump and Stokes beams, as well as the Raman active mode of the resonant carbon nanotubes are chosen such that the photoresist would absorb the anti-Stokes photons to enhance its solubility to a developing agent. In contrast, the photoresist surrounding the non-resonant nanotubes is not exposed to such anti-Stokes photons, or is exposed to only low levels of such anti-Stokes photons. More particularly, the incident photons can include two pump beams and a Stokes beam separated in frequency by an amount corresponding to a Raman active vibrational frequency of the resonant carbon nanotubes, but different (off-resonance) relative to the Raman active vibrational frequencies of the non-resonant carbon nanotubes. Further, in some cases, the pump frequency or the Stokes frequency can be selected to be in resonance with an electronic states transition of the resonant carbon nanotubes. By scanning the beam (e.g., in the form of high intensity laser pulses) across the sample, anti-Stokes photons are generated via coherent Raman scattering of the incident photons by the resonant carbon nanotubes.

At least a portion of the anti-Stokes photons are absorbed by a portion of the photoresist surrounding the resonant carbon nanotubes. As noted above, in this implementation, the photoresist is selected to be a positive-tone resist that would exhibit enhanced solubility to a developing agent in response to absorption of the anti-Stokes photons. In contrast, the photoresist surrounding the non-resonant carbon nanotubes remains insoluble to the developing agent as the non-resonant carbon nanotubes do not mediate significant generation of anti-Stokes photons.

Figure 10A:
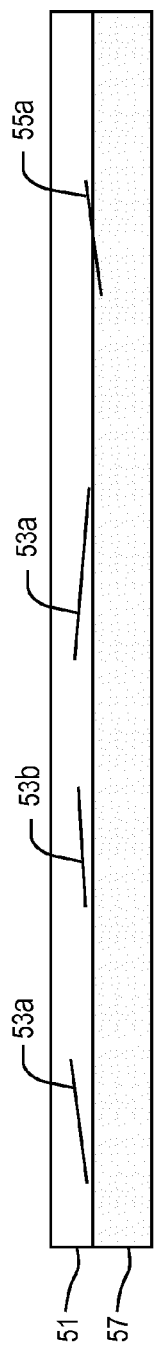
FIG. 10C shows the photoresist layer after the removal of the soluble photoresist portion by utilizing a developing agent, thereby uncovering the resonant carbon nanotube.
FIG. 10D shows the photoresist layer after removal of the uncovered carbon nanotube.
Figure 10B:
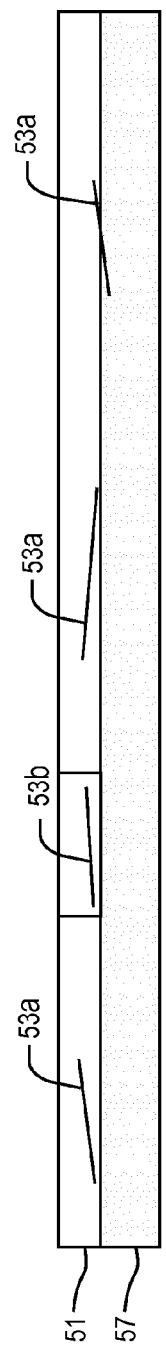

For example, FIG. 10B schematically shows that a portion of the photoresist (shaded portion) surrounding a resonant carbon nanotube 53b that has been exposed to anti-Stokes photons while the other portions, including those surrounding the non-resonant carbon nanotubes, have not been exposed to such anti-Stokes photons.

Figure 10C:
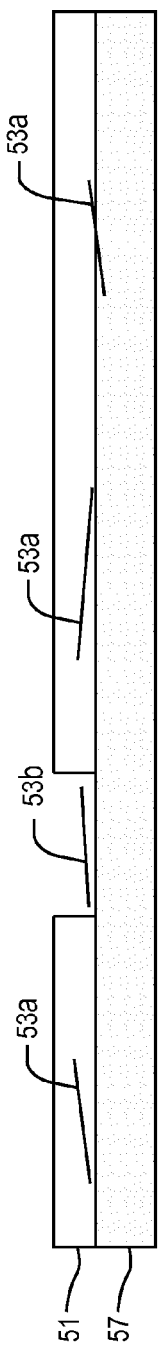

In a subsequent step (3), the portions of the photoresist that were exposed to the anti-Stokes photons surrounding the resonant carbon nanotubes can be removed, e.g., by dissolving the exposed portions of the photoresist in a developing agent in a manner known in the art of lithography to expose (uncover) the resonant carbon nanotubes, e.g., resonant carbon nanotube 53b shown schematically in FIG. 10C, while the non-resonant carbon nanotubes (e.g., carbon nanotubes 53a) remain covered by the photoresist. Some suitable developing agents include, without limitation, aqueous alkaline developers.

Figure 10D:
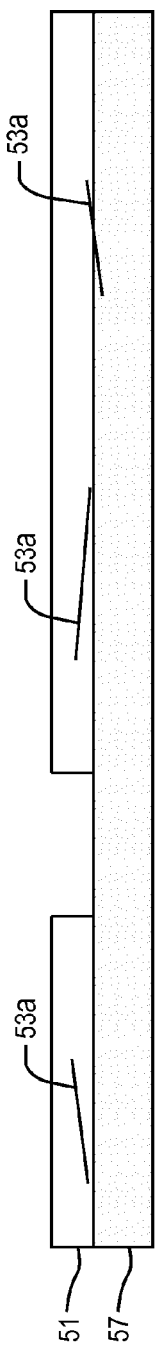

Subsequently, the uncovered resonant carbon nanotubes can be removed from the substrate, e.g., via chemical or physical etching processes (acid, plasma, etc), leaving behind on the substrate the covered, non-resonant carbon nanotubes (step 4), as shown schematically in FIG. 10D.

The unexposed photoresist can then be optionally removed, e.g., by employing a chemical treatment (typically known in the art as a "stripping" process). In this manner, the selective removal of the resonant carbon nanotubes from the substrate can be achieved.

In other cases, a negative photoresist can be employed to selectively remove non-resonant carbon nanotubes from a collection of resonant and non-resonant carbon nanotubes disposed over a substrate. By way of example, in such a case, the anti-Stokes photons generated by coherent Raman scattering of incident radiation by the resonant carbon nanotubes can cause polymerization of a portion of the photoresist surrounding the resonant nanotubes to render those portions insoluble to a developer, while the unexposed portions remain soluble to the developer. The soluble portions can then be removed to uncover the non-resonant nanotubes and remove them.

The publications referenced in these appendices are herein incorporated by reference in their entirety.

Those having ordinary skill in the art will appreciate that various modifications can be made to the above embodiments without departing from the scope of the invention.

The invention claimed is:

1. A method of separating nanoparticles exhibiting different Raman-enhancement factors, comprising
   contacting a plurality of nanoparticles, on each of which one or more Raman-active molecules are adsorbed, with a photopolymerizable medium,
   exposing a plurality of said nanoparticles to radiation so as to excite at least one Raman active vibrational mode of said molecules in order to generate Raman-shifted radiation having a wavelength suitable for polymerizing said medium such that the Raman-shifted radiation causes selective polymerization of at least a portion of the medium surrounding one or more nanoparticles if said one or more nanoparticles provide a Raman enhancement factor greater than a threshold, and
   separating at least a portion of said nanoparticles from the remaining nanoparticles.

2. The method of claim 1, further comprising separating nanoparticles that are at least partially surrounded by polymerized medium from the remaining nanoparticles.

3. The method of claim 2, wherein said step of separating comprises centrifugation.

4. The method of claim 1, wherein the step of contacting a plurality of nanoparticles with a photopolymerizable medium comprises introducing the plurality of nanoparticles into the photopolymerizable medium.

5. The method of claim 4, wherein said nanoparticles comprise metallic nanoparticles and said one or more Raman-active molecules are adsorbed onto said metallic nanoparticles.

6. The method of claim 1, wherein said plurality of nanoparticles comprises carbon nanotubes of at least two different types characterized by different Raman scattering characteristics, and wherein said step of contacting the plurality of nanoparticles with a photopolymerizable medium comprises
   dispersing said plurality of carbon nanotubes of at least two types in the photopolymerizable medium, and
   wherein said step of exposing said nanoparticles to radiation comprises illuminating said dispersed nanotubes with incident radiation adapted to cause resonant Raman scattering from nanotubes of one of said types so as to generate blue-shifted anti-Stokes radiation having a wavelength suitable for polymerizing said medium, said incident radiation being off-resonance relative to the other types of the nanotubes, wherein the blue-shifted anti-Stokes radiation causes polymerization of at least a portion of the medium surrounding the nanotubes that are on resonance with the incident radiation, thereby selectively adding mass to said on-resonance nanotubes.

7. The method of claim 6, further comprising separating said on-resonance nanotubes from the other types of nanotubes based on the polymeric mass added to said on-resonance nanotubes.

8. The method of claim 6, wherein one type of the nanotubes comprises metallic nanotubes and the other type of nanotubes comprises semiconducting nanotubes.

9. The method of claim 6, wherein said resonant Raman scattering comprises coherent anti-Stokes Raman scattering.

10. The method of claim 1, wherein said plurality of nanoparticles comprises a plurality of particles having at least two types of Raman scattering characteristics, and
wherein said step of contacting the plurality of nanoparticles with a photopolymerizable medium comprises
dispersing said plurality of particles having at least two types of Raman scattering characteristics in a photopolymerizable medium, and wherein said step of exposing the plurality of said nanoparticles to radiation comprises
illuminating said particles with radiation on resonance with particles of one type so as to cause generation of coherent anti-Stokes blue-shifted radiation primarily from said on-resonance particles,
said blue-shifted radiation being suitable for polymerizing at least a portion of said polymerizable medium surrounding said on-resonance particles so as to selectively add polymeric mass to said on-resonance particles.

11. The method of claim 1, wherein said step of contacting a plurality of nanoparticles with a photopolymerizable medium comprises
forming a layer of a negative-tone photoresist over one or more nanoparticles disposed on a substrate so that the nanoparticles are disposed within the photoresist layer, and wherein said step of exposing the plurality of said nanoparticles to radiation comprises
directing incident radiation to the photoresist layer such that at least one of said nanoparticles mediates the generation of blue-shifted anti-Stokes photons such that said anti-Stokes photons are absorbed by at least a portion of the photoresist surrounding said nanoparticle to cause polymerization thereof to form an electrically insulating coating that at least partially surrounds the nanoparticle.

12. The method of claim 11, wherein said nanoparticles comprise carbon nanotubes.

13. The method of claim 11, wherein said incident radiation comprises two pump beams each at a pump frequency ($\omega_p$) and a Stokes beam at a Stokes frequency ($\omega_s$) such that a difference between the pump frequency and the Stokes frequency corresponds to a vibrational frequency of at least one Raman active vibrational mode of said at least one nanoparticle.

14. The method of claim 13, wherein at least one of said pump frequency and said Stokes frequency corresponds to a frequency of an electronic states transition of said nanoparticles.

15. The method of claim 11, further comprising removing the unexposed portions of said photoresist layer.

16. The method of claim 15, wherein said step of removing the unexposed portions of the photoresist layer comprises dissolving said unexposed portions of the photoresist in a developing agent.

17. The method of claim 11, wherein said negative-tone photoresist layer comprises any of epoxy-based polymers and monomer-photo-initiator mixtures.

18. The method of claim 17, wherein said developing agent comprises any of propylene glycol monomethyl ether acetate (PGMEA) or acetone.

19. The method of claim 11, wherein said step of forming the photoresist layer comprises spin-casting the photoresist over the substrate.

20. The method of claim 11, wherein said substrate comprises a silicon substrate.

21. The method of claim 1, wherein said plurality of nanoparticles comprises a collection of nanoparticles of different types disposed over a substrate, and wherein said step of contacting the plurality of nanoparticles with a photopolymerizable medium comprises
forming a photoresist layer over the plurality of nanoparticles of at least two different types disposed on a substrate such that said nanoparticles are contained within the resist layer, and wherein the step of exposing said nanoparticles to radiation comprises
directing incident radiation to the photoresist layer such that nanoparticles of only one of said types mediates generation of blue-shifted anti-Stokes photons such that said anti-Stokes photons are absorbed by at least portions of the photoresist surrounding the nanoparticles mediating the generation of said photons to change solubility of said photoresist portions to a developing agent, and further comprising:
applying a developing agent to said photoresist layer to selectively remove portions of the photoresist exhibiting a greater solubility to said developing agent thereby selectively uncovering the nanoparticles of one of said types, and
removing said uncovered nanoparticles.

22. The method of claim 21, wherein said incident radiation comprises two pump beams each at a pump frequency ($\omega_p$) and a Stokes beam at a Stokes frequency ($\omega_s$) such that a difference between the pump frequency and the Stokes frequency corresponds to a vibrational frequency of at least one Raman active vibrational mode of one type of the nanoparticles while being significantly different than the vibrational frequencies of Raman active modes of the other type of nanoparticles.

23. The method of claim 21, wherein one of said pump frequency or said Stokes frequency corresponds to a frequency of an electronic resonance of said nanoparticles mediating the generation of the anti-Stokes photons.

24. The method of claim 21, wherein said collection of nanoparticles comprises a collection of metallic and semiconducting carbon nanotubes.

25. The method of claim 24, wherein said difference between the pump frequency and the Stokes frequency is substantially on resonance with at least one Raman active vibrational mode of said metallic carbon nanotubes and is off resonance relative to Raman active vibrational modes of the semiconducting carbon nanotubes.

26. The method of claim 24, wherein said difference between the pump frequency and the Stokes frequency is substantially on resonance with at least one Raman active vibrational mode of said metallic carbon nanotubes and is off resonance relative to Raman active vibrational modes of the semiconducting carbon nanotubes.

27. The method of claim 21, wherein said photoresist is a positive-tone photoresist and said anti-Stokes photons render at least portions of the photoresist surrounding the nanoparticles that effect generation of said anti-Stokes photons soluble to the developing agent.

28. The method of claim 21, wherein said developing agent causes removal of said soluble portions of the photoresist thereby uncovering the nanoparticles that effect the generation of the anti-Stokes photons.

29. The method of claim 21, wherein said photoresist comprises a positive-tone photoresist.

30. The method of claim 27, wherein said developing agent comprises an aqueous alkaline solution.

* * * * *